Patented July 20, 1943

2,324,980

UNITED STATES PATENT OFFICE 2,324,980

METHOD OF RECLAIMING SYNTHETIC RUBBER

Frederick L. Kilbourne, Jr., Copley, Ohio, assignor to The Firestone Tire & Rubber Company, Akron, Ohio, a corporation of Ohio No Drawing. Application April 30, 1940, Serial No. 332,607

8 Claims. (Cl. 260—27)

This invention relates to a method of reclaiming vulcanized synthetic rubber, and relates especially to a method of reclaiming a vulcanized synthetic rubber derived essentially from butadiene or derivatives thereof.

A vulcanized rubber differs essentially from the unvulcanized material by being much less thermoplastic and possessing much greater strength, elasticity and resistance to the actions of solvents and swelling agents. It is the object of any rubber reclaiming process to restore to the vulcanized rubber the essential properties of the unvulcanized material in as great a degree as is practicable. A good reclaimed rubber is said to have three important characteristics which distinguish it from the unreclaimed vulcanized material, i. e., "softness," "body," and "tack." "Softness" means merely what the word implies, and a good reclaimed rubber possesses a similar degree of plasticity or softness to that of a crude unvulcanized rubber. "Body" is that property of a reclaimed rubber which permits it to be stretched slightly without tearing; a good reclaimed rubber can be stretched several hundred per cent without breaking apart. "Tack" is the property of adhesiveness and is desirable in a reclaimed rubber in that it improves the processing qualities of the rubber.

The commercial processes for reclaiming vulcanized natural rubber depend primarily on the use of heat, usually in conjunction with water or steam, to effect the reclaiming. This is so because vulcanized natural rubber gradually softens on the application of substantial heat thereto.

However, a certain class of vulcanized synthetic rubbers behaves differently from vulcanized natural rubber towards heat. This class of synthetic rubbers is derived essentially from a diolefin having the following chemical formula:

wherein R is a hydrogen atom, a methyl radical or a chlorine atom. The commercial rubbers contemplated as coming within this class of synthetic rubbers include "neoprene" (a polymer of 2-chloro-1, 3-butadiene) and the various butadiene rubbers, such as "Buna S" (co-polymer of butadiene and styrene) and "Perbunan" (co-polymer of butadiene and acrylonitrile).

Attempts to reclaim a vulcanized synthetic rubber of the class just described by the usual rubber reclaiming processes have failed, these processes seemingly having no particular beneficial effect on the synthetic rubber. It has now been ascertained that the fundamental reason for these failures is that these synthetic rubbers are hardened by the substantial application thereto of heat alone and are not softened thereby.

It is, therefore, a primary object of the invention to provide a method of reclaiming a vulcanized synthetic rubber derived essentially from butadiene or its derivatives.

Another object is to provide a method of reclaiming a vulcanized synthetic rubber of the type which is hardened by the application thereto of a substantial amount of heat alone.

The above and further objects and advantages of the invention will be manifest from the description of the invention given herein.

Broadly, the invention comprises heating a vulcanized synthetic rubber together with a swelling agent and a softening agent. The heating is preferably carried out in a closed container or otherwise under pressure, in order that the relatively volatile swelling agent will be able to penetrate the rubber. The heating is suitably conducted at the usual rubber reclaiming temperatures above 212° F. and for a period of time sufficient to cause substantial reclaiming to occur. Preferably, the heating period is less than 2 hours, since longer heating tends to harden the initially softened rubber.

According to the invention the vulcanized synthetic rubber is first broken up by mechanical means to produce a ground rubber preferably of such size that it will pass a 5 mesh screen. The ground vulcanized synthetic rubber is then mixed with a swelling agent and at least one softening agent, and the mixture is charged into an open or closed container. The closed container may be heated by any uniform heating means, but the open container is preferably heated in a larger closed container by a hot fluid, such as steam, under pressure, introduced therein. After the heating step, the devulcanized product is preferably subjected to a vacuum treatment to remove most of the swelling agent, and then refined one or more times according to the usual reclaiming practice with respect to natural rubber. The refining treatment serves to homogenize the devulcanized rubber and separate hard lumps of foreign material therefrom.

Swelling agents suitable for use in the method of the invention include the following relatively volatile liquids: crude solvent naphtha, refined solvent naphtha, petroleum naphtha, turpentine, dipentene and cymene.

Suitable softening agents include the following oils, resins, and mixtures: asphalt, Paraflux asphalt residue from cracking crude petroleum, (United States Patent No. 1,611,436), pine tar, mineral rubber, medium process oil, rosin, coumarone resins, cottonseed oil and rosin oil.

Certain of the softening agents just listed are especially active in increasing the tack of the reclaimed synthetic rubber and may be called "tack-producing agents." Such tack-producing agents include, especially, coumarone resins, rosin, rosin oil, and pine tar. They are particularly helpful in producing a good reclaimed rubber when used in conjunction with another softening agent of high efficiency, such as Paraflux.

It is to be noted that certain crude commercial solvents, such as crude solvent naphtha, act both as swelling agents and softening agents, since they each contain lower boiling (swelling) substances, and higher boiling (softening) substances. One of such solvents can be used as the sole reclaiming agent in the present process.

The various reclaiming agents are conveniently added to the ground synthetic rubber by first forming a solution of the softening agent and/or tack-producing agent in the swelling agent employed and then mixing the solution with the ground rubber in a mechanical mixing apparatus, such as a Werner-Pfleiderer mixer.

The following are specific examples of the application of the invention which have been found to give good results in actual practice:

Example 1

A sample of vulcanized neoprene scrap is ground on a mill to pass a 5 mesh sieve. One hundred parts of the ground scrap are mixed with 25 parts of crude solvent naphtha, and the mixture is heated in open steam for 30 minutes at 375° F. The heated mixture is found to be well devulcanized, being similar to unvulcanized neoprene in softness and having a good body.

A reclaimed neoprene having an improved body and better tack is produced by additionally including 8.8 parts of rosin in the above mixture prior to the heating step.

Example 2

One hundred parts of vulcanized neoprene scrap are ground to pass a 5 mesh sieve and are then mixed in a Werner-Pfleiderer mixer with a solution of 5 parts of rosin and 15 parts of Paraflux in 10 parts of refined solvent naphtha. The mixture is heated in open steam for 1 hour at 375° F., and then subjected to a vacuum of 20 inches for 2 hours to remove volatile material. The product is found to be well devulcanized. The devulcanized product is prepared for commercial use by being mill-massed for 10 minutes, then refined twice, then strained through a 20 mesh screen, and finally refined again. The finished reclaimed neoprene can be satisfactorily used to replace a large proportion of unvulcanized neoprene in a standard formula.

Example 3

Vulcanized Perbunan, heavily loaded with carbon black, is ground on a mill to pass a 14 mesh sieve. A solution of 20 parts of Paraflux and 10 parts of a coumarone resin in 10 parts of refined solvent naphtha is thoroughly mixed with 100 parts of the ground Perbunan. The mixture is then heated for 1 hour at 375° F. in open steam to produce a devulcanized Perbunan suitable for compounding in standard formulas for Perbunan.

Example 4

A vulcanized Buna S carbon black tire tread stock is ground on a mill to pass a 5 mesh sieve, and then 100 parts of this ground stock are thoroughly mixed with a solution of 10 parts of Paraflux and 5 parts of rosin in 50 parts of solvent naphtha. The mixture is heated in open steam for 15 minutes at about 485° F., and thereafter is found to be well devulcanized, the product having very good body and tack.

Similarly successful results are obtained when Perbunan is substituted for the Buna S specified in the preceding paragraph.

By means of the present invention it is now possible to produce a reclaimed synthetic rubber of such good properties that it can be used alone or diluted with the corresponding unvulcanized synthetic rubber in the same manner that reclaimed natural rubber is employed. The economic value of the invention is obvious in view of the former unsatisfactory use of the ground vulcanized synthetic rubber as a coarse filler in new synthetic rubber stocks.

Various modifications of the invention can be restorted to without departing from the spirit of the invention or the scope of the appended claims.

What is claimed is:

1. A method of reclaiming synthetic rubber, which comprises the step of heating together a mixture of a swelling agent selected from the group consisting of crude solvent naphtha, refined solvent naphtha, petroleum naphtha, turpentine, dipentene and cymene, a softening agent selected from the group consisting of crude solvent naphtha, asphalt, asphalt residue from cracking crude petroleum, pine tar, mineral rubber, medium process oil, rosin, coumarone resins, cottonseed oil and rosin oil and a vulcanized polymer of 2-chloro-1, 3-butadiene for a period of time less than two hours at a temperature above 212° F.

2. A method of reclaiming synthetic rubber, which comprises the step of heating together a mixture of a swelling agent selected from the group consisting of crude solvent naphtha, refined solvent naphtha, petroleum naphtha, turpentine, dipentene and cymene, a softening agent selected from the group consisting of crude solvent naphtha, asphalt, asphalt residue from cracking crude petroleum, pine tar, mineral rubber, medium process oil, rosin, coumarone resins, cottonseed oil and rosin oil, and a vulcanized copolymer of butadiene and acrylonitrile for a period of time less than two hours at a temperature above 212° F.

3. A method of reclaiming synthetic rubber, which comprises the step of heating together a mixture of a swelling agent selected from the group consisting of crude solvent naphtha, refined solvent naphtha, petroleum naphtha, turpentine, dipentene and cymene, a softening agent selected from the group consisting of crude solvent naphtha, asphalt, asphalt residue from cracking crude petroleum, pine tar, mineral rubber, medium process oil, rosin, coumarone resins, cottonseed oil and rosin oil, and a vulcanized copolymer of butadiene and styrene for a period of time less than two hours at a temperature above 212° F.

4. A method of reclaiming a vulcanized synthetic rubber which is characterized by the tendency to harden on the application thereto of heat alone, which method comprises the steps of breaking down into relatively small pieces a vulcanized synthetic rubber of the above type selected from the group consisting of vulcanized polymers of 2-chloro-1,3-butadiene, vulcanized co-polymers of butadiene and acrylonitrile and vulcanized co-polymers of butadiene and styrene, mixing the broken down synthetic rubber with a swelling agent selected from the group consisting of crude solvent naphtha, refined solvent naphtha, petroleum naphtha, turpentine, dipentene and cymene, and a softening agent selected from the group consisting of crude solvent naphtha, asphalt, asphalt residue from cracking crude petroleum, pine tar, mineral rubber, medium process oil, rosin, coumarone resins, cottonseed oil and rosin oil, and then heating the mixture for a period of less than 2 hours at a temperature above 212° F.

5. A method of reclaiming a vulcanized synthetic rubber which is characterized by the tendency to harden on the application thereto of heat alone, which method comprises the step of heating together for a period of less than 2 hours at a temperature above 212° F. a mixture of a swelling agent selected from the group consisting of crude solvent naphtha, refined solvent naphtha, petroleum naphtha, turpentine, dipentene and cymene, a softening agent selected from the group consisting of crude solvent naphtha, asphalt, asphalt residue from cracking crude petroleum, pine tar, mineral rubber, medium process oil, rosin, coumarone resins, cottonseed oil and rosin oil and a vulcanized synthetic rubber of the above type selected from the group consisting of vulcanized polymers of 2-chloro-1,3-butadene, vulcanized co-polymers of butadiene and acrylonitrile and vulcanized co-polymers of butadiene and styrene.

6. A method of reclaiming a vulcanized synthetic rubber which is characterized by the tendency to harden on the application thereto of heat alone, which method comprises the step of heating together for a time not exceeding one hour at a temperature of at least about 375° F., a mixture of a swelling agent selected from the group consisting of crude solvent naphtha, refined solvent naphtha, petroleum naphtha, turpentine, dipentene and cymene, a softening agent selected from the group consisting of crude solvent naphtha, asphalt, asphalt residue from cracking crude petroleum, pine tar, mineral rubber, medium process oil, rosin, coumarone resins, cottonseed oil and rosin oil and a vulcanized synthetic rubber of the above type selected from the group consisting of vulcanized polymers of 2-chloro-1,3-butadiene, vulcanized co-polymers of butadiene and acrylonitrile and vulcanized co-polymers of butadiene and styrene.

7. A method of reclaiming a vulcanized synthetic rubber which is characterized by the tendency to harden on the application thereto of heat alone, which method comprises the steps of breaking down into relatively small pieces a vulcanized synthetic rubber of the above type consisting of vulcanized polymers of 2-chloro-1,3-butadiene, mixing the broken down synthetic rubber with a swelling agent selected from the group consisting of crude solvent naphtha, refined solent naphtha, petroleum naphtha, turpentine, dipentene and cymene and a softening agent selected from the group consisting of crude solvent naphtha, asphalt, asphalt residue from cracking crude petroleum, pine tar, mineral rubber, medium process oil, rosin, coumarone resins, cottonseed oil and rosin oil, and then heating the mixture for a period of less than 2 hours at a temperature above 212° F.

8. A method of reclaiming synthetic rubber, which comprises the step of heating together a mixture of rosin, asphalt residue from cracking crude petroleum, solvent naphtha and a vulcanized polymer of 2-chloro-1,3-butadiene for a period of less than two hours at a temperature above 212° F.

FREDERICK L. KILBOURNE, Jr.